UNITED STATES PATENT OFFICE.

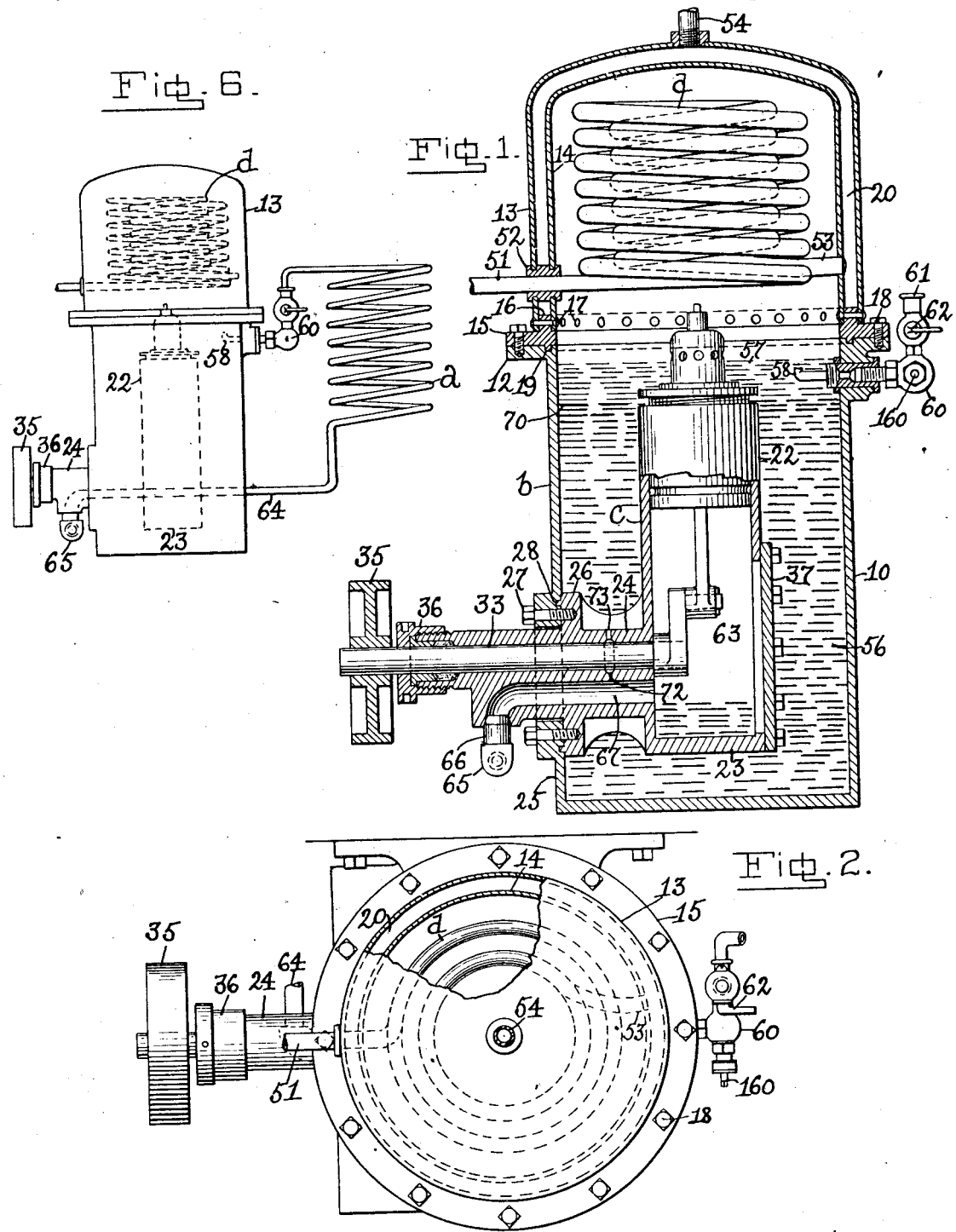

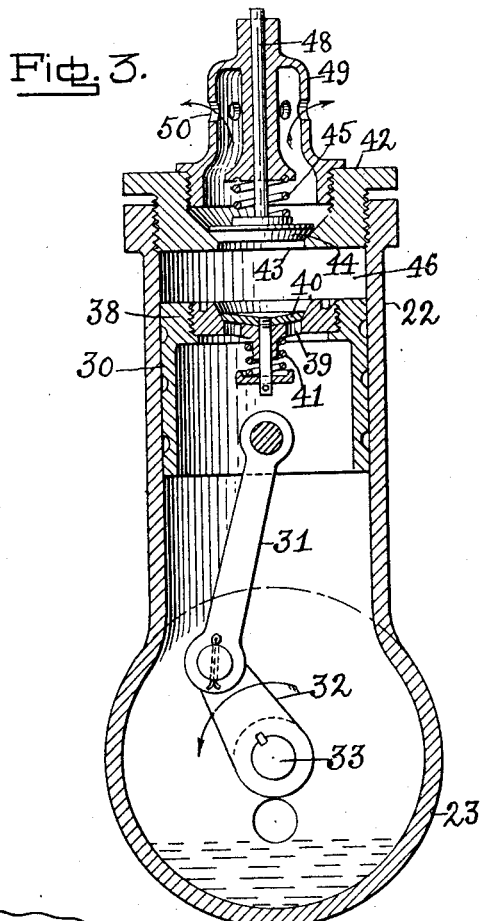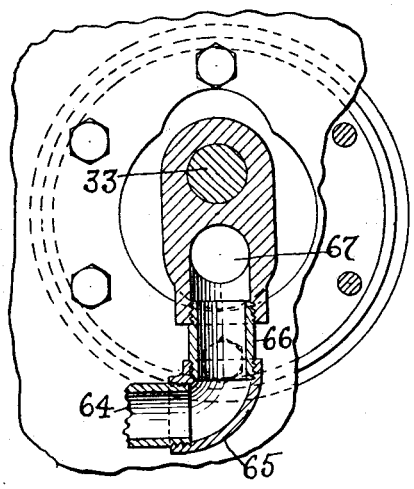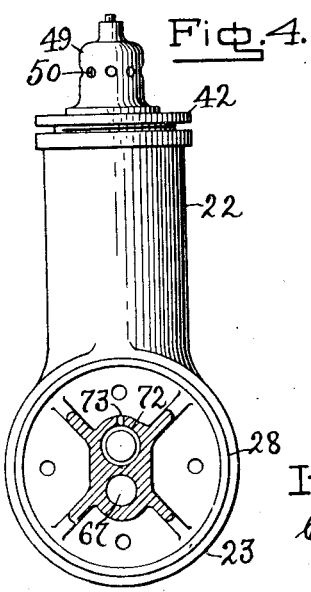

CYRUS H. HAPGOOD, OF BOSTON, MASSACHUSETTS, ASSIGNOR TO MONTCLAIR REFRIGERATING CORPORATION, OF NEW YORK, N. Y., A CORPORATION OF NEW YORK.

REFRIGERATING APPARATUS.

1,131,130.  Specification of Letters Patent.  Patented Mar. 9, 1915.

Application filed March 1, 1913. Serial No. 751,394.

*To all whom it may concern:*

Be it known that I, CYRUS H. HAPGOOD, a citizen of the United States, residing in Boston, county of Suffolk, and State of Massachusetts, have invented an Improvement in Refrigerating Apparatus, of which the following description, in connection with the accompanying drawings, is a specification, like letters on the drawings representing like parts.

This invention relates to a refrigerating apparatus of that character in which a pump is automatically started in operation to effect circulation of refrigerant when the temperature of the refrigerating chamber has risen to a predetermined point and to be stopped in its operation when the temperature has fallen to a predetermined point. One form of such apparatus is shown and described in U. S. Patent No. 1,046,588 granted to me December 10, 1912, which is especially designed and adapted for use in households and like places wherever apparatus of small refrigerating capacity suffices.

The present invention has for its object to provide an apparatus of the character described which may be made in small sizes and used in households or like places, but which is also especially adapted to be embodied to advantage in apparatus of large refrigerating capacity, which apparatus is compact, efficient, of minimum cost and capable of using a refrigerant which is subjected to a relatively high pressure.

In the refrigerating system shown in the patent referred to, a rotary pump is employed to circulate a large volume of refrigerant under a relatively low pressure, and when said pump is stopped flooding of the expansion chamber is prevented by equalization of the pressure in the system back through the pump. The system described in this patent in which a rotary pump is used is highly satisfactory for units of substantially small refrigerating capacity, but is not economical or desirable for units or plants of large refrigerating capacity owing to the abnormally large and heavy rotary pump and the increased power which would be required to obtain the desired refrigeration.

The present invention has for its object to provide a system of the character described, namely one which is automatic and does not require personal attention, in which a large refrigerating capacity may be economically obtained with a compact apparatus capable of circulating the refrigerant under a relatively high pressure. To this end provision is made whereby the high pressure of the refrigerant may be obtained, and flooding of the expansion chamber permitted without danger of rendering the system inoperative or without danger of injuring the system or the users of the same. For this purpose, I employ a reciprocating pump which is self clearing as will be described and has a substantially fluid tight crank case, and locate the said pump in a casing containing a body of fluid lubricant so that the latter surrounds the crank case and arrange for the discharge of liquid from the expansion chamber into said crank case, and also arrange for the return to the casing of the lubricant which is discharged by the pump. Provision is also made for preventing escape of refrigerant to the atmosphere. Provision is further made for quickly and easily assembling the apparatus and for simplifying the same. These and other features of this invention will be pointed out in the claims at the end of this specification.

Figure 1 is a vertical section, with parts in elevation of a sufficient portion of a refrigerating system embodying this invention to enable it to be understood. Fig. 2, a plan of Fig. 1 with parts broken away. Fig. 3, a vertical section of the pump shown in Fig. 1. Fig. 4, a side elevation of the pump shown in Fig. 1. Fig. 5, a detail to illustrate the connection of the expansion chamber with the crank case of the pump, and Fig. 6, a diagrammatic view to illustrate the system.

The refrigerating system herein shown as embodying this invention, comprises essentially an expansion chamber, shown as a coil $a$, a fluid tight casing $b$, a self clearing reciprocating pump $c$ located in said casing, and a condenser $d$.

The fluid tight casing $b$ is preferably composed of a lower part or member and a chambered upper part or member, which are detachably secured together. The lower member may be made as a casting 10 open at its upper end and provided with an outwardly extended flange 12, and the chambered upper member may be made of two substantially dome shaped heads 13, 14 preferably of sheet metal, which rest upon a bottom piece or ring 15 having an annular flange or rib 16, which extends between the heads 13, 14 and is secured thereto by rivets 17 or otherwise. The ring 15 is secured to the flange 12 by screws 18 or otherwise, and may and preferably will be provided on its under surface with an annular rib 19, which enters a corresponding groove in the upper surface of the lower member 10. The heads 13, 14 are separated to form a chamber 20 for a purpose as will be described. The lower member of the casing contains the reciprocating pump c, preferably of the construction herein shown, said pump comprising a cylinder 22 in open communication with a crank case 23, having extended from one of its side walls a hub 24, which is long enough to project through an opening in the side wall 25 of the casing, and is provided within the casing with an annular flange 26, which is secured to the casing by the screws 27 or otherwise. The flange 26 may be provided with an annular rib 28 which extends into an annular groove on the inner surface of the side wall 25. The reciprocating pump is thus supported within the casing b. The cylinder 22 of the pump contains a hollow reciprocating piston 30, see Fig. 3, which is joined by a connecting rod 31 with a crank 32 on a crank shaft 33, having bearings in the hub 24 and extended through the same to the outside of the casing, where it is provided with suitable means for rotating it, said means being shown as a pulley 35. The shaft 33 is also extended through a suitable stuffing box 36 secured to the outer end of the hub 24. The crank case 23 is provided with a removable cover 37, by removing which access may be had to the crank case. The piston 30 is provided in its head 38 with a port 39 with which coöperates a valve 40, normally held to its seat by a spring 41 and adapted to be opened by pressure within the cylinder and crank case on the down stroke of the piston.

The cylinder 22 is provided as shown with a removable head 42, having a port 43, with which coöperates a valve 44, normally held to its seat by a spring 45 and adapted to be opened outwardly by pressure in the chamber 46 above the piston, which chamber may be designated the compression chamber for the cylinder. The valve 44 is guided in its movement by a stem 48 extended through a hollow or bell shaped cap 49, which is removably secured to the cylinder head 42 and is provided with one or more ports or openings 50 which communicate with the casing b. The valve 44 is opened on the upstroke of the piston as will be described.

The casing b contains in its upper part the condenser d, herein shown as a coil of pipe, one end 51 of the coil being extended through a bushing or thimble 52 to the outside of the casing, and the other end 53 of the coil being extended through the inner head 14 and communicating with the chamber 20 between said heads. The outer head 13 has secured to it a pipe 54 which communicates with the chamber 20 and forms the outlet pipe therefor. The pipe 51 is designed to be connected with a suitable source of supply of water, or other cooling medium, and the water flows through the coil d into the chamber 20 and then through the outlet pipe 54 to the sewer or to any other place desired. The lower part of the casing is designed to contain a body of fluid lubricant 56 such as oil, and a body of liquid refrigerant 57, which latter is designed to pass from said casing through a pipe 58, which practically forms the inlet pipe for the expansion chamber, the latter being herein shown as the coil a of pipes, having its higher end connected with a fitting 60 secured to the casing b and with which the inlet pipe 58 communicates. The fitting 60 is provided with a supply pipe 61 having a valve 62, which is normally closed and is opened when it is desired to supply the casing with oil and liquid refrigerant. The fitting 60 is provided with a needle valve 160 or with a fixed orifice in lieu thereof.

The lower end of the expansion coil a is connected with the chamber 63 formed by the crank case 23 of the pump within the casing b, which may be effected as herein shown, see Figs. 1 and 5, wherein the pipe 64, which forms part of the coil a, is connected by a bend 65 and nipple 66 with a passage 67 in the hub 24, said passage communicating with the chamber 63.

From the above description it will be seen, that the liquid refrigerant passes from the casing b through the pipe 58 and fitting 60 into the coil a, wherein it expands and reduces the temperature of the chamber in which the coil is located. The gaseous refrigerant produced in the expansion coil passes back into the chamber 63 and on the down stroke of the piston passes through the port 39 into the compression chamber 46, from which it is expelled on the up stroke of the piston and passes through the port 43 and ports 50 into the casing b, wherein it is condensed by the condenser d. When the temperature in the refrigerating chamber (not shown) has been reduced to a predetermined point, it is desirable to stop the pump, which may be effected in a manner well understood namely by thermostatic control (not shown) but which may be substantially such as shown in U. S. Patent No. 1046588 granted to me Dec. 10, 1912, and to again start the same when the temperature in the refrigerating chamber has risen to a predetermined point. When the pump is stopped, circulation of the refrigerant ceases, and the pressure in the system is equalized through the expansion orifice, with the result, that the coil becomes flooded with liquid, which in the present case, does no harm, as this liquid flows back from the expansion coil into the chamber 63, which may be of sufficient cubic capacity to take care of all of the liquid with which the expansion chamber is flooded. If the pump is again started under these conditions, it will work satisfactorily, for the reason that the cylinder of the pump is not filled with liquid and there is nothing in the pump cylinder to prevent reciprocation of the piston therein, and as the crank shaft is rotated, the crank splashes through the liquid in the chamber 63, and throws the same in comminuted form, that is, more or less as a spray, up into the cylinder, and this spray passes through the port 39 into the compression chamber 46 and through the port 43 and ports 50 into the casing $b$, until the crank case is emptied or substantially emptied and the refrigerating cycle is again established. A sufficient quantity of fluid lubricant such as glycerin or other oil is used to bring the level of the same up to the line 70 and sufficient liquid refrigerant, is used to bring the level of the latter above the mouth of the pipe 58 when a refrigerant lighter than the oil is used. Any of the well known refrigerants may be used, such for instance as anhydrous ammonia, methyl chlorid, methyl-ether, sulfur dioxid or the like. It will be observed that the chamber 63 forms part of the circuit through which the refrigerant is circulated, and that the reciprocating pump is surrounded by the fluid lubricant, which serves to cool the pump, and that this cooling liquid is at the discharge pressure of the pump, which is greater than the mean internal pressure of the pump, consequently any leak in the casing of the pump, tends to feed the lubricant into the pump and thereby prevents escape of refrigerant from the pump, and provision is also made for preventing escape of the refrigerant along the main shaft to the atmosphere, which is preferably effected by providing the hub 24 with an annular chamber or recess 72 around the bore of the hub, which communicates through a hole 73 in the hub with the casing $b$, so that the oil in the casing can pass into the annular channel 72 and surround the shaft 33 with oil, which is under the pressure of the casing and therefore under a greater pressure than the refrigerant in the crank case, thereby sealing the pump against leakage of refrigerant along the shaft 33.

By making the lower member of the casing open at its top and the upper member removable therefrom, the pump can be readily placed into and removed from the lower member of the casing. So also by making the upper member of the casing of two dome shaped heads which are spaced apart, the cost of the casing may be materially reduced, as the said heads may be made of sheet metal, and at the same time the chamber 20 may be utilized as a part of the condenser, so that a maximum condensing surface may be obtained in an apparatus of minimum size at a minimum expense.

It will be observed that owing to the fact that the crank shaft makes a complete revolution, the lubricant in the crank case is thrown up by the crank into the lower end of the cylinder and passes in the form of a spray through the port 39 in the piston on the down stroke of the latter, and then is forced through the ports 43, 50 into the casing, and that no matter how high the liquid is in the crank case the pump in a short time will clear itself and lower the liquid to substantially the level indicated in Fig. 1 and will then operate in a normal manner.

Owing to the fact that the pump is self clearing, it can be started under full speed without danger of injuring the system, the pump itself or the users of the system.

The apparatus herein described is capable of employing a refrigerant under a relatively high pressure and is therefore commercially available for both large and small units.

Claims:

1. In a refrigerating apparatus, in combination, a casing for containing a fluid lubricant and a liquid refrigerant, a self clearing reciprocating pump located in said casing and comprising a cylinder discharging into said casing, a valved piston reciprocating in said cylinder, a substantially fluid tight crank case, a rotatable crank shaft having a crank revoluble in said crank case and acting upon liquid therein to splash the same up into the said cylinder, said crank shaft being extended to the outside of said casing and sealed by the lubricant surrounding the crank case against the escape of refrigerant out of the casing along said crank shaft, an expansion chamber located outside of said casing and having its fluid inlet communicating with said casing and its fluid outlet discharging into said crank case, for the purpose specified.

2. In a refrigerating apparatus, in combination, a casing for containing a body of fluid lubricant, a self clearing reciprocating pump having a substantially fluid tight crank case located in said casing and surrounded by said lubricant, an expansion chamber located outside of said casing and having a fluid outlet discharging into said crank case and means for returning to said casing the lubricant discharged by said pump.

3. In a refrigerating apparatus, in combination, a casing for containing a fluid lubricant and a liquid refrigerant, a self clearing reciprocating pump provided with a substantially fluid tight crank case and located in said casing to have the crank case surrounded by fluid lubricant therein, and communicating with said casing to return to the latter fluid lubricant which may accumulate in the crank case, an expansion chamber located outside of said casing and having its fluid inlet communicating with said casing and its fluid outlet discharging into the crank case of said reciprocating pump.

4. In a refrigerating apparatus of the character described, in combination, a casing for containing a body of fluid lubricant, a self clearing reciprocating pump located in said casing and having a substantially fluid tight crank case surrounded by said fluid lubricant, and an expansion chamber located outside of said casing and having its fluid outlet discharging into said crank case.

5. In a refrigerating apparatus, in combination, a casing for containing a fluid lubricant, a reciprocating pump located in said casing and provided with a cylinder communicating with said casing and having a substantially fluid-tight crank case communicating with said cylinder, a valved piston reciprocating in said cylinder, a crank shaft extended from within said crank case to the outside of said casing and provided with a crank revoluble in said crank case, and an expansion chamber having its outlet extended into said casing and discharging into said crank case.

6. In a refrigerating apparatus, in combination, a casing having a lower member open at its top and an upper member removably secured to the top of said lower member and comprising substantially dome shaped heads separated to form a chamber between them, a condenser located in said upper member and communicating with the outside of said upper member and with the chamber between the heads thereof, substantially as described.

7. In a refrigerating apparatus, in combination, a casing comprising a lower member open at its top, and an upper member removably secured to the top of said lower member, and a pump located in said lower member and having a crank shaft and a hub for said crank shaft extended through a side of the lower member to the outside thereof, substantially as described.

8. In a refrigerating apparatus, in combination, a casing comprising a lower member open at its top, and an upper member removably secured to the top of said lower member, and a pump located in said lower member and having a shaft and a hub for said shaft extended through the lower member to the outside thereof, said hub within said casing having an annular channel in the walls of its bore and an opening connecting said channel with said casing, for the purpose specified.

9. In a refrigerating apparatus, in combination, a casing comprising a lower member open at its top, and an upper member removably secured to the top of said lower member, and a pump located in said lower member and having a shaft and a hub for said shaft extended through the lower member to the outside thereof, said hub having a passage communicating at its inner end with the said pump and having its outer end outside of said casing, for the purpose specified.

10. In a refrigerating apparatus, in combination, a casing having a lower member open at its top and a chambered upper member removably secured to the top of said casing, a condenser carried by said removable upper member and in communication with the chamber of said upper member and with the outside thereof, substantially as described.

11. In a refrigerating apparatus, in combination, a casing comprising a lower member open at its top, and an upper member removably secured to the top of said lower member, and a pump located in said lower member and having a shaft and a hub for said shaft extended through the lower member to the outside thereof, said hub having a flange, and means to secure said flange to said casing, substantially as described.

12. In a refrigerating apparatus, in combination, a casing comprising a lower member open at its top, and an upper member removably secured to the top of said lower member, a pump located in said lower member, and a condenser located in said upper member and supported thereby and removable therewith.

13. In a refrigerating apparatus, in combination, a casing, a reciprocating pump located in said casing and provided with a crank case having attached to it a hub for the crank shaft of said pump, said hub being provided with a passage communicating with said crank case and with the outside of said casing, and means to secure said hub to a wall of said casing, substantially as described.

14. In a refrigerating apparatus, in combination, a casing, a self clearing reciprocating pump located in said casing and having a crank case within said casing in communication with the outside of said casing and a cylinder communicating with said casing to return to the latter fluid lubricant which may accumulate in said crank case.

15. In a refrigerating apparatus, in combination, a casing for containing a body of lubricant, a self-clearing reciprocating pump having a substantially fluid-tight crank case located in said casing and surrounded by said lubricant, said pump having its discharge outlet in communication with said casing to subject the lubricant in the latter to the discharge pressure of the pump, an expansion chamber located outside of said casing and having a fluid outlet discharging into said crank case, and means for returning to said casing the lubricant discharged by said pump.

16. In a refrigerating apparatus, in combination, a casing for containing a body of lubricant, a self-clearing reciprocating pump having a substantially fluid-tight crank case located in said casing and surrounded by said lubricant, said pump having its discharge outlet in communication with said casing to subject the lubricant in the latter to the discharge pressure of the pump, and an expansion chamber located outside of said casing and having a fluid outlet discharging into said crank case.

In testimony whereof, I have signed my name to this specification in the presence of two subscribing witnesses.

CYRUS H. HAPGOOD.

Witnesses:
 GUY MULLER,
 ROBT. N. BARIER.